June 14, 1960 W. F. SPECKMAN 2,940,458
MEAT CUT WASHING AND GLAZING MACHINE
Filed Jan. 30, 1957 3 Sheets-Sheet 1
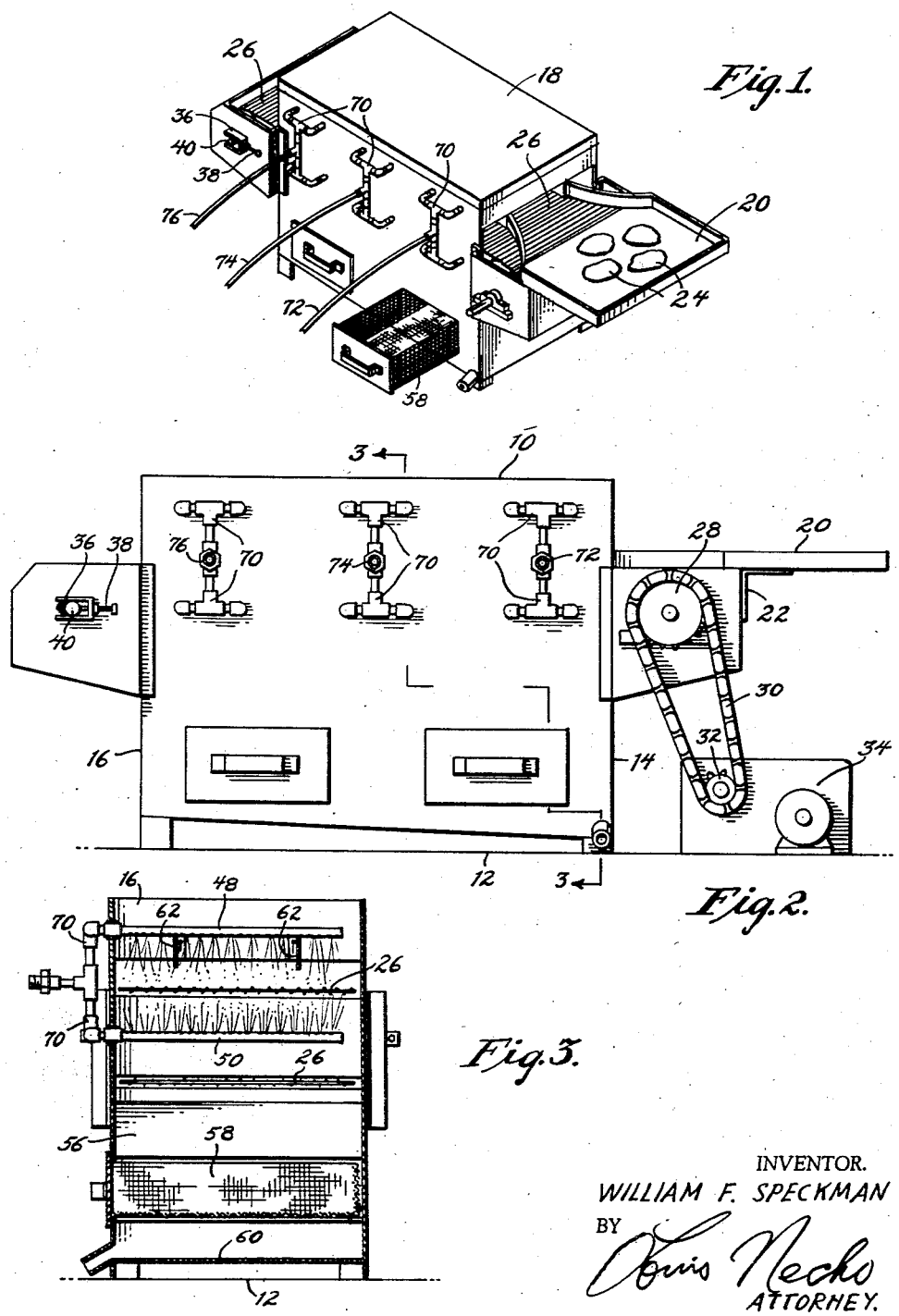
INVENTOR.
WILLIAM F. SPECKMAN
BY
ATTORNEY.

June 14, 1960 W. F. SPECKMAN 2,940,458
MEAT CUT WASHING AND GLAZING MACHINE
Filed Jan. 30, 1957 3 Sheets-Sheet 2

INVENTOR.
WILLIAM F. SPECKMAN
BY
ATTORNEY.

June 14, 1960   W. F. SPECKMAN   2,940,458
MEAT CUT WASHING AND GLAZING MACHINE
Filed Jan. 30, 1957   3 Sheets-Sheet 3
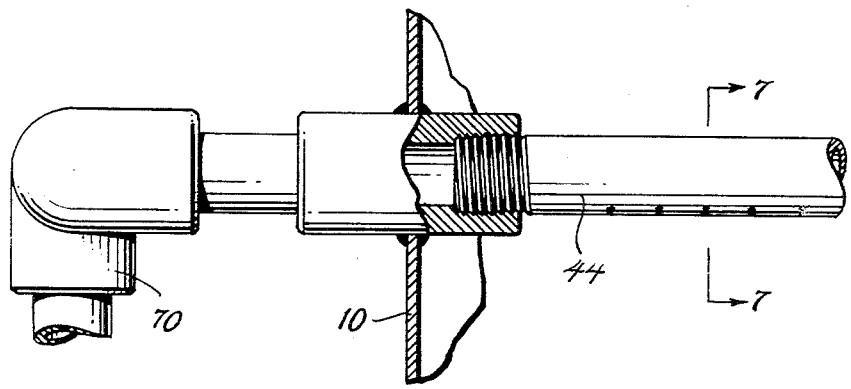
Fig. 6.
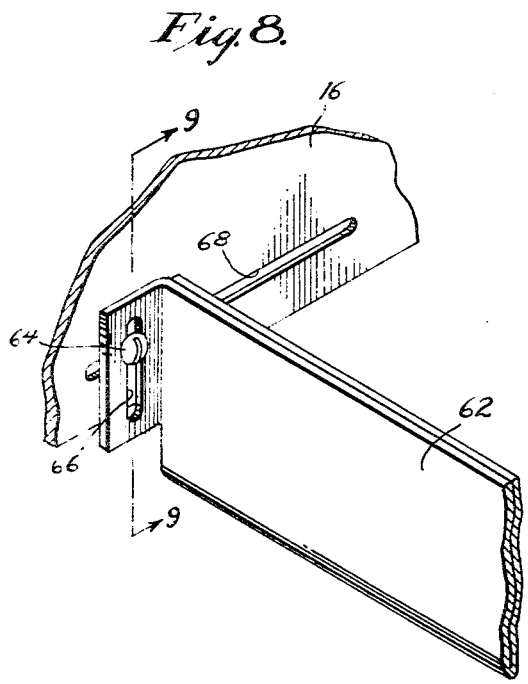
Fig. 8.
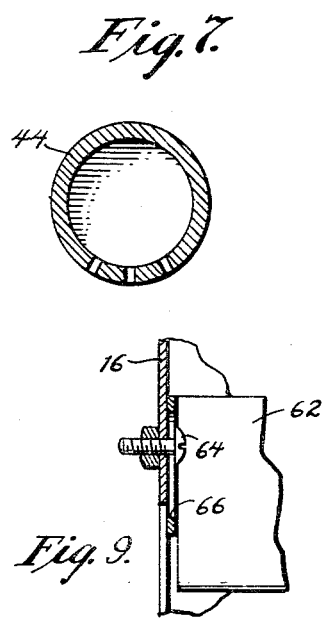
Fig. 7.
Fig. 9.
INVENTOR.
WILLIAM F. SPECKMAN
BY
ATTORNEY.

United States Patent Office

2,940,458
Patented June 14, 1960

2,940,458

MEAT CUT WASHING AND GLAZING MACHINE

William F. Speckman, Newtown Square, Pa., assignor to Renainre Corporation, Springfield, Pa., a corporation of Pennsylvania Filed Jan. 30, 1957, Ser. No. 637,279

1 Claim. (Cl. 134—63)

The trend in the food industry is more and more toward prepackaged and chilled, or frozen, cuts of meat which are usually wrapped in transparent, sealed packages and placed in open-top refrigerated display cases for sale to the public on a self-service basis.

When a piece of meat, such as a steak or a chop, is cut from the appropriate part of the animal, the leg bone, or the back bone is sawed and this produces powdered bone which adheres to the meat. Also, during handling and cutting of the meat itself, loose particles of fat, or meat, or other foreign particles, adhere to the chop or steak. It is now customary to brush the bone dust and other foreign particles off the meat cuts, but this practice is slow, is not wholly effective and it defaces the meat cut. In fact, brushing the meat tends to work the finer particles of foreign matter into, instead of removing them from, the meat cut.

It is therefore the object of the invention to produce a washing machine wherein meat cuts can be passed in a continuous fashion and wherein the opposite sides of the meat are simultaneously subjected to effective water sprays whereby the meat cut is cleaned of all particles of bone dust, fat or the like.

To this end, I first subject the meat cut to a spray of warm water calculated to loosen adhered particles, then to a spray of room temperature water to complete the washing and to lower the temperature of the meat cut, and finally, to a spray of near-freezing temperature water to chill the meat before it is re-frozen and which, upon freezing, gives the meat cut a somewhat glazed and highly attractive appetizing appearance.

The full nature of the invention will be understood from the following specification and the accompanying drawings in which:

Fig. 1 is a perspective view of a meat cut washing machine embodying my invention.

Fig. 2 is an enlarged side elevational view of the apparatus shown in Fig. 1.

Fig. 3 is a sectional view looking in the direction of line 3—3, in Fig. 2.

Fig. 6 is a view, partly in section and partly in elevation, showing details of construction.

Fig. 7 is an enlarged, sectional view looking in the direction of line 7—7 on Fig. 6.

Fig. 8 is an enlarged perspective view also showing details of construction.

Fig. 9 is a sectional view looking in the direction of line 9—9 on Fig. 8.

Figure 4:
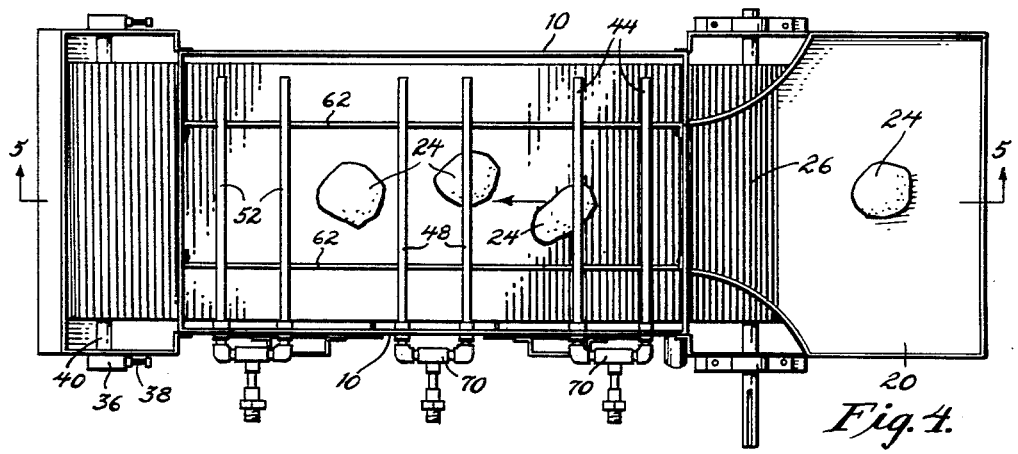
Fig. 4 is an enlarged, top plan view of the apparatus shown in Fig. 1 with the top cover removed.
Figure 5:
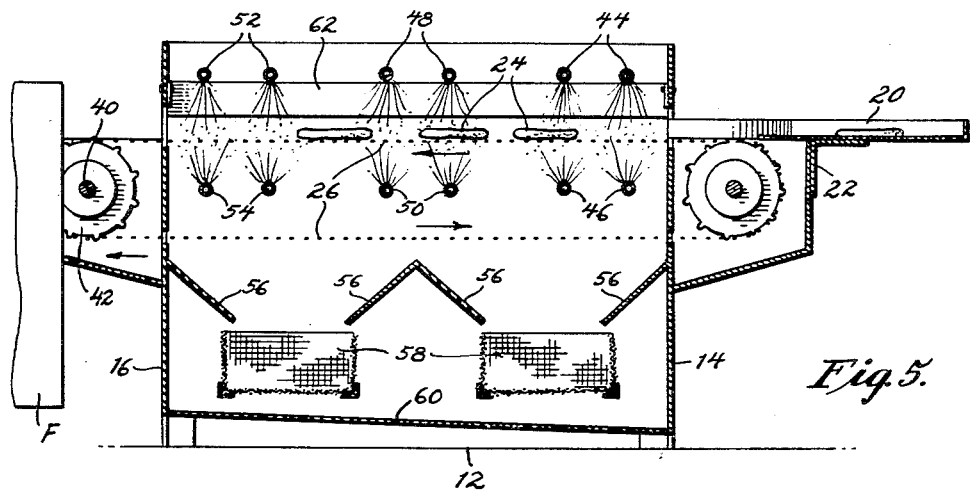
Fig. 5 is a sectional view looking in the direction of line 5—5 on Fig. 4.

The machine illustrated includes a casing which is formed of side walls 10 and 12, and end walls 14 and 16, and is of a generally rectangular shape as best shown in Fig. 4. The top of the machine is closed by a removable cover 18. At the feed end of the machine, which is the right hand end as viewed in Figs. 1, 2, 4 and 5, there is a receiving tray 20 which is suitably supported by bracket 22 and on which the meat cuts 24 to be washed are placed, manually, or otherwise. Registering with tray 20 is the receiving end of an endless conveyor 26 which is propelled in the direction of the arrows in Figs. 4 and 5, or from right to left as viewed in these figures, by means of a sprocket wheel 28 which is driven by a sprocket chain 30 which also engages the drive shaft 32 of a variable prime mover 34. Near the discharge end of the conveyor I provide an adjustment mechanism for regulating the tension of the conveyor. As best shown in Fig. 2, this mechanism includes a bracket 36 and a screw 38 threaded through the bracket and bearing against an idler shaft 40 of idler sprocket 42 which supports the discharge end of the conveyor as shown in Fig. 5.

In order to wash the opposite sides of meat cuts 24, while they are moved by the conveyor, I provide opposite sets of nozzles 44 and 46 which spray hot water against the opposite sides of the meat cuts to loosen and remove adhering particles; opposite sets of nozzles 48 and 50 which spray room temperature to complete the washing and to reduce the temperature of the meat cuts 24, and opposite sets of nozzles 52 and 54, which spray near-freezing water against the opposite sides of the meat cuts to prepare the cuts for deep freezing in a freezer F and to remove any foreign particles which may not have been removed by the preceding sprays.

In practicing this invention I also found that the spray of near freezing water immediately before deep freezing of the meat leaves a very thin film of water which, when frozen, gives the meat cut a very attractive appearance.

Figure 10:
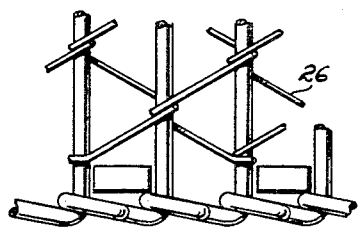
Fig. 10 is a fragmentary, enlarged, top plan view showing the construction of the conveyor which is only diagrammatically shown in the other drawings.

In order to prevent clogging, the conveyor is made of a coarse or very open mesh weave, as diagrammatically shown in Fig. 10.

The water used in washing the meat is directed, by suitable baffles 56, into fine, or close mesh, strainers 58 which trap the particles of foreign matter carried away from the meat for disposal, or for use in making animal feed products. The water which drains from strainers 58 falls on inclined drain board 60 which communicates with a suitable receptacle or drain not shown.

If desired, I may provide guide slats 62 between which, or beneath which, the meat cuts are adapted to pass. Slats 62 are vertically adjustable by means of set screw 64 and vertical slot 66, and are laterally adjustable by screw 64 and horizontal slot 68.

The various sets of sprays are in the nature of elongated tubes having apertures of the desired size, number and distribution and are connected to corresponding manifolds 70 which are supplied with water through pipes 72, 74 and 76 respectively. In order to be able to vary the sprays as desired, the pipes are threadedly mounted, as best shown in Fig. 6, so that by merely unscrewing one of the sprays it can be removed and another spray can be mounted in its place.

What I claim is:

A meat-cut washing and glazing machine including an open mesh conveyor adapted to receive and propel said meat-cut, a first set of nozzles for spraying warm water on opposite sides of said meat cut to loosen adhering particles, a second set of nozzles for spraying room temperature water on opposite sides of said meat-cut to wash away said particles, a third set of nozzles for spraying near freezing water on opposite side of said meat cut, a freezer adjacent said machine and into which said conveyor delivers said meat cuts to glaze the same, vertically and laterally adjustable guides for forming compartments for receiving meat cuts of various sizes, a strainer below said conveyor, and a baffle for directing the water falling through said conveyor to said strainer.

References Cited in the file of this patent

UNITED STATES PATENTS

| | | |
|---|---|---|
| 831,084 | Lisa | Sept. 18, 1906 |
| 1,018,046 | Goldman | Feb. 20, 1912 |
| 1,280,950 | Bernheim | Oct. 8, 1918 |
| 1,512,918 | Forsgard | Oct. 28, 1924 |
| 1,674,064 | Ridley | June 19, 1928 |
| 2,574,058 | Porter | Nov. 6, 1951 |
| 2,667,661 | Long | Feb. 2, 1954 |
| 2,746,466 | Clague | May 22, 1956 |
| 2,808,615 | Snow | Oct. 8, 1957 |

OTHER REFERENCES

Wolff: "Plumbing Catalog," 1928 edition, page 35 3/4B, Wolff Co., 2057 W. Fulton St., Chicago, Ill.